United States Patent [19]

Nose et al.

[11] Patent Number: 5,068,142

[45] Date of Patent: Nov. 26, 1991

[54] FIBER-REINFORCED POLYMERIC RESIN COMPOSITE MATERIAL AND PROCESS FOR PRODUCING SAME

[75] Inventors: Kenkichi Nose, Ibaraki; Tadahiko Takata, Osaka; Masuo Tsuge, Ibaraki, all of Japan

[73] Assignee: Teijin Limited, Osaka, Japan

[21] Appl. No.: 508,849

[22] Filed: Apr. 12, 1990

[30] Foreign Application Priority Data

Jan. 31, 1989 [JP] Japan .................................. 1-19591
Apr. 17, 1989 [JP] Japan .................................. 1-95387
Jan. 31, 1990 [JP] Japan .................................. 2-19075

[51] Int. Cl.$^5$ .................. D03D 17/00; B32B 7/00; D02G 3/00; B29C 47/00
[52] U.S. Cl. .................. 428/232; 264/176.1; 264/177.13; 264/177.2; 428/255; 428/294; 428/295; 428/374; 428/378; 428/408; 428/902; 428/903
[58] Field of Search ............... 428/373, 374, 294, 378, 428/408, 232; 264/176.1, 174.2, 177.13, 29.2

[56] References Cited

U.S. PATENT DOCUMENTS 4,640,861  2/1987  Binnersley et al. ................. 428/294
4,792,481  12/1988  O'Connor et al. ................. 428/378

Primary Examiner—George F. Lesmes
Assistant Examiner—James D. Withers
Attorney, Agent, or Firm—Burgess, Ryan & Wayne

[57] ABSTRACT

A fiber-reinforced polymeric resin composite material useful for producing a shaped composite article having a high thermal stability and mechanical strength, and a low creep strain, comprises a thermoplastic polymeric resin matrix and a number of reinforcing individual fibers embedded within the polymeric resin matrix in such a manner that 10% to 70% by the number of the individual fibers are separated from each other through portions of the polymeric resin matrix and the remaining individual fibers form at least one fiber bundle.

8 Claims, 6 Drawing Sheets

FIBER-REINFORCED POLYMERIC RESIN COMPOSITE MATERIAL AND PROCESS FOR PRODUCING SAME

BACKGROUND OF THE INVENTION

(1) Field of the Invention

The present invention relates to a fiber-reinforced polymeric resin composite material and a process for producing same. More particularly, the present invention relates to a fiber-reinforced polymeric resin composite material useful as a reinforcing material for shaped or molded polymeric resin materials, particularly for shaped or molded polymeric resin materials for civil engineering and construction, and a process for producing same.

(2) Description of the Related Arts

In the prior art, it is known that a thermoplastic polymeric resin material reinforced by a fiber material is produced by a process comprising the steps of knead-mixing a melt of a thermoplastic polymeric resin with chopped strands prepared by cutting a reinforcing fiber bundle into a length of about 5 mm in an extruder; extruding the mixture through the extruder; cutting the extruded strands to provide pellets; and converting the pellets to a shaped or molded article.

This conventional process has the following disadvantages:

(1) Where the reinforcing fiber bundle is composed of organic fibers, for example, wholly aromatic polyamide (aramide) fibers, the resultant chopped strands form a bulky mass, and thus it is difficult to smoothly feed the bulky chopped strands into an extruder or kneader.

(2) Where the reinforcing fiber bundle is composed of inorganic fibers, for example, carbon fibers or glass fibers, and the resultant chopped fibers are knead-mixed with a polymeric resin melt in an extruder or kneader while a high shearing force is applied thereto, the fibers are easily broken and converted to small particles having a size of about 5 mm or less. The resultant inorganic small particles exhibit substantially no or a very poor effect of reinforcing the shaped or molded polymeric resin article.

Also, it is known that, when recently developed heat-resistant resin materials, for example polyphenylene sulfide (PPS), polyetherether ketone (PEEK) or polyether sulfone (PES), reinforced by a fiber bundle, are subjected to a pellet-forming process in an extruder or to a injection-molding process, a bundling agent applied to the reinforcing fiber bundle is thermally degraded, and thus the dispersion of the individual fibers in the resin matrix becomes difficult.

Further, it is known that, when a fiber bundle-reinforced polymeric resin article is employed at a high temperature, water vapor is generated from the fiber bundle and a bundling agent applied to the fiber bundle is thermally decomposed or modified so as to generate water vapor or another decomposition gas, and thus the heat resistance and mechanical strength of the fiber bundle-reinforced polymeric resin article are lowered by the generation of water vapor or other decomposition gas.

Japanese Unexamined Patent Publication Nos. 62-240351 and 57-90020 disclose means for eliminating the above-mentioned disadvantages, but these means are effective only for eliminating the difficulty in the feeding of the bulky chopped strands to the extruder or kneader or for preventing the breakage of the chopped strands in the extruder or kneader, and the disadvantages derived from the generation of water vapor and the decomposition gas are not eliminated by the above-mentioned prior arts.

It is important that individual fibers in the fiber bundle-reinforced polymeric resin article be covered by the polymeric resin, but, in the conventional fiber bundle-reinforced polymeric resin article produced by impregnating a fiber bundle with a polymeric resin melt having a high viscosity under the ambient atmospheric pressure, only the outside periphery of the fiber bundle is covered by the polymeric resin, and the peripheries of individual fibers in the fiber bundle are not completely covered by the polymeric resin. Therefore, in the conventional fiber bundle-reinforced polymeric resin article, the reinforcing effect of the individual fibers is not satisfactory.

Japanese unexamined Patent Publication No. 61-40113 discloses a fiber-reinforced polymeric resin article in which reinforcing continuous multifilaments are dispersed in a matrix consisting of a polymeric resin without preheating the multifilaments at a temperature not lower than the melting point of the polymeric resin. In this article, the individual multifilaments are substantially completely covered by the polymeric resin, but the bundling agent applied to the multifilaments is still maintained on the multifilaments and generates a decomposition gas at a high temperature. Therefore, the resultant shaped or molded article exhibits a lower heat resistance and mechanical strength.

Furthermore, it is important that the continuous multifilaments be uniformly dispersed and mixed in the polymeric resin matrix in the longitudinal direction of the multifilaments, but the process as disclosed in the above-mentioned Japanese Publication does not provide a satisfactory even dispersion of the multifilaments in the polymeric resin matrix.

SUMMARY OF THE INVENTION

An object of the present invention is to provide a fiber-reinforced polymeric resin composite material in which a certain number of reinforcing individual fibers are separately distributed from each other in a polymeric resin matrix and which is free from a generation of gaseous substances even at a high temperature, and a process for producing same.

Another object of the present invention is to provide a fiber-reinforced polymeric resin composite material useful for producing a fiber-reinforced polymeric resin article having a high thermal stability, a satisfactory mechanical strength, and a low creep strain, and a process for producing same at a satisfactory efficiency.

The above-mentioned objects can be attained by the fiber-reinforced polymeric resin composite material of the present invention, which comprises: (A) a matrix consisting essentially of a thermoplastic polymeric resin; and (B) a number of individual reinforcing fibers extending substantially in parallel to each other and embedded within the polymeric resin matrix in a manner such that 10 to 70% by the number of the individual fibers are separated from each other through portions of the polymeric resin matrix, and the remaining individual fibers come into direct contact with each other to form at least one fiber bundle.

The above-mentioned fiber-reinforced polymeric resin composite material can be produced by the process of the present invention comprising the steps of: (a)

preheating at least one fiber bundle consisting essentially of a number of individual reinforcing fibers extending substantially in parallel to each other at a temperature of not lower than the melting point of a polymeric resin to be reinforced by the individual fibers; (b) impregnating and covering the preheated fiber bundle with a melt of the polymeric resin while applying thereto a pressure of 25 kg/cm$^2$ or more to an extent such that the individual fibers are embedded within the polymeric resin melt in such a manner that 10% to 70% by the number of the individual fibers are separated from each other through portions of the polymeric resin melt while the remaining individual fibers are maintained in direct contact with each other to form at least one fiber bundle; and (c) shaping the resultant polymeric resin melt-impregnated fiber bundle by passing the bundle through a shaping nozzle having a predetermined cross-sectional profile and area, to provide a fiber-reinforced polymeric resin composite material.

DESCRIPTION OF THE PREFERRED EMBODIMENTS

The fiber-reinforced polymeric resin composite material of the present invention comprises (A) a matrix consisting essentially of a thermoplastic polymeric resin and (B) a number of individual reinforcing fibers extending substantially in parallel to each other and embedded in the polymeric resin matrix.

The thermoplastic polymeric resin usable for the present invention comprises at least one type of polymer preferably selected from the group consisting of polyamides, for example, nylon 6 and nylon 66 polyolefins, for example, polyethylenes and polypropylenes; polyesters, for example, polyethylene terephthalate and polybutylene terephthalate; polyacrylates, for example, polymethyl acrylate and polymethyl methacrylate; polysulfones, for example, Udel (trademark); polyarylensulfides, for example; polyethersulfones; polyetherimides; polyamideimides; polyacrylonitrile; polycarbonates; polyacetals; and polystyrene.

The thermoplastic polymeric resin usable for the present invention preferably has a melting point or heat-decomposition point of about 100° C. or more, more preferably, from 120° C. to 400° C.

The individual reinforcing fibers preferably have a melting point or heat decomposition point higher than those of the polymeric resin to be reinforced by the individual fibers.

Preferably, the reinforcing fibers usable for the present invention comprise at least one type of fiber selected from the group consisting of carbon fibers, glass fiber, wholly aromatic polyamide (aramide) fibers, stainless steel fibers, copper fibers, and amorphous metal fibers.

The cross-sectional profile and the thickness of the individual fibers are not specifically limited, respectively, but preferably the individual fibers have a diameter of 3 to 200 μm, and a circular cross-sectional profile.

The polymeric resin may contain, as an additive, at least one member selected from the group consisting of anti-heating agents, weather-proof agents, anti-ultraviolet ray agents, anti-static agents, lubricants, releasing agents, dyes, pigments, crystallization-promoting agents, and flame retardants.

Figure 1:
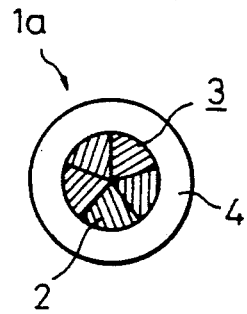
FIG. 1 shows a cross-sectional profile of an embodiment of conventional fiber-reinforced polymeric resin composite materials in which embodiment a plurality of individual reinforcing fibers are in the form of one fiber bundle embedded in a polymeric resin matrix.

Referring to FIG. 1, a conventional fiber-reinforced polymeric resin composite material 1a comprises a single fiber bundle 3 and a polymeric resin matrix 4. The fiber bundle 3 consists of a plurality of individual fibers 2 extending substantially in parallel to each other and coming into direct contact with each other, and located at the center portion of the polymeric resin matrix 4, to form a core of the composite material 1a.

In this composite material 1a, the polymeric resin is not distributed inside of the fiber bundle 3.

In this type of conventional composite material, each individual fiber is bonded at only a small portion of periphery thereof to the polymeric resin matrix. Therefore, the contribution of each individual fiber toward the reinforcing of the polymeric resin matrix is relatively small. For example, the conventional fiber-reinforced polymeric resin material of the type shown in FIG. 1 exhibits an unsatisfactory resistance to bending.

Figure 2A:
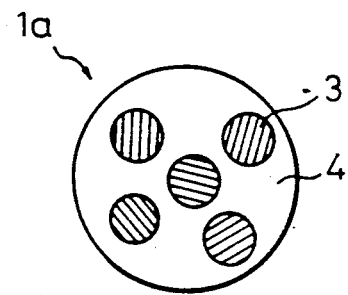
FIG. 2A shows a cross-sectional profile of another embodiment of conventional fiber-reinforced polymeric resin composite material, in which embodiment a plurality of fiber bundles each consisting of a plurality of individual fibers and having a circular cross-sectional profile are separately embedded in a polymer resin matrix.
Figure 3:
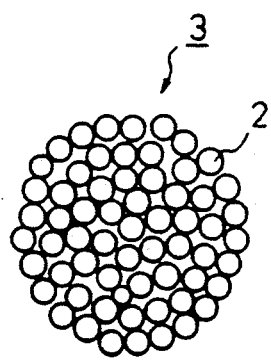
FIG. 3 shows cross-sectional profiles of a number of individual reinforcing fibers contained in the form of a fiber bundle in a conventional fiber-reinforced polymeric resin composite material.

Referring to FIG. 2A, a plurality of fiber bundle 3 having a circular cross-sectional profile are separately embedded within a polymeric resin matrix 4. In each fiber bundle 3, a plurality of individual fibers (not shown) come into direct contact with each other as indicated in FIG. 3, and the polymeric resin is not distributed inside of the fiber bundles 3.

The reinforcing effect of the plurality of fiber bundles as shown in FIG. 2A is higher than that of the single fiber bundle as shown in FIG. 1, but the reinforcing effect of the individual fibers in the composite material as shown in FIG. 2A is still not satisfactory due to the small bonding area of the individual fibers to the polymeric resin matrix.

Figure 2B:
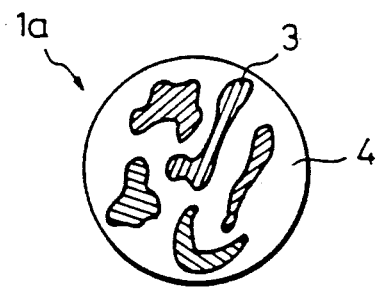
FIG. 2B shows a cross-sectional profile of another embodiment of conventional fiber-reinforced polymeric resin composite material, in which embodiment a plurality of fiber bundles each consisting of a plurality of individual fibers and having an irregular cross-sectional profile are separately embedded in a polymeric resin matrix.

In the fiber-reinforced polymeric resin composite material shown in FIG. 2B, a plurality of fiber bundles 3 having an irregular cross-sectional profile are separately embedded within a polymeric resin matrix 4. In each fiber bundle 4, a number of individual fibers come into direct contact with each other, and the polymeric resin is not distributed inside of the fiber bundle.

The fiber bundle having the irregular cross-sectional profile exhibits a higher reinforcing effect than that having a circular cross-sectional profile, but the reinforcing effect of the fiber bundles as shown in FIG. 2B is still not satisfactory due to the small bonding area of the individual fibers to the polymeric resin matrix.

In the fiber-reinforced polymeric resin composite material, when all of the individual fibers are separated from each other through portions of the polymeric resin matrix and bonded at the entire peripheral surface areas thereof to the polymeric resin matrix, the entirely bonded individual fibers exhibit an excessively reduced freedom in the deformation thereof. Therefore, the resultant composite material exhibits an excessively high resistance to deformation, for example, bending, and thus cannot be easily handled.

The above-mentioned disadvantages of the conventional fiber-reinforced polymeric resin composite material are eliminated by the present invention.

In the composite material of the present invention, it is essential that a number of individual fibers extending substantially in parallel to each other be embedded within a polymeric resin matrix in a manner such that 10% to 70%, preferably 20% to 60% by the number of the individual fibers are separated from each other through portions of the polymeric resin matrix, while the remaining individual fibers come into direct contact with each other to form at least one fiber bundle.

When the number of the separated individual fibers is less than 10% based on the total number of the individual fibers, the individual fibers are easily drawn out from the polymeric resin matrix by a relatively small drawing force and the total contribution of the individual fibers on the reinforcing effect for the polymeric resin matrix is unsatisfactory. Also, when the separated individual fibers are in an amount of more than 70% based on the total number of the individual fibers, the resultant composite material exhibits an excessively large resistance to deformation, for example, bending.

Figure 4:
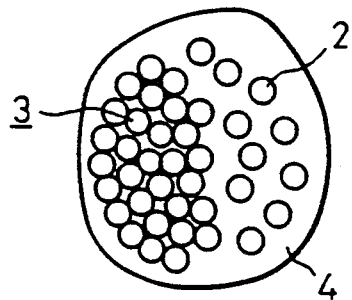
FIG. 4 shows cross-sectional profiles of a number of individual reinforcing fibers contained in a fiber-reinforced polymeric resin composite material of the present invention in a manner such that the certain number of individual fibers are separated from each other and the remaining individual fibers are in the form of a fiber bundle.

In a fiber-reinforced polymeric resin composite material of the present invention indicated in FIG. 4, a number of individual fibers 2 are distributed in a polymeric resin matrix 4 in such a manner that a certain number of individual fibers 2 are separated from each other through portions of the polymeric resin matrix 4 and the remaining 30% to 90% by the number of the individual fibers 2 come into direct contact with each other to form a fiber bundle 3 so that the polymeric resin is not substantially distributed inside of the fiber bundle 3.

The separated individual fibers contribute to an enhancement of the resistances of the individual fibers to drawing out and to deformation of the resultant composite material. The remaining individual fibers in the form of a fiber bundle contribute to an enhancement of the flexibility of the resultant composite material. Accordingly, the composite material of the present invention has satisfactory resistances to drawing out and to deformation, and a good flexibility.

In the composite material of the present invention, preferably the individual fibers are substantially free from certain substances, for example, moisture and bundling agent, which generate gaseous substances, for example, water vapor and decomposition gas at a temperature not lower than the melting point of the polymeric resin. This feature effectively enhances the heat resistance and the mechanical properties of the resultant fiber-reinforced polymeric resin composite article.

Preferably, the individual fibers are in an amount of 10 to 90%, more preferably 20 to 80%, based on the weight of the polymeric resin matrix.

Also, the individual fibers preferably have a diameter of 3 to 200 $\mu$m, more preferably 5 to 100 $\mu$m, still more preferably 5 to 50 $\mu$m.

The composite material of the present invention preferably exhibits a creep strain of 5% or less after a tensile load corresponding to 40% of the tensile strength of the composite material is applied thereto for 1000 hours.

The low creep composite material of the present invention is useful for civil engineering and construction.

Generally, the reinforcing materials for civil engineering and construction are embedded in earth to prevent a landslide. Japanese Unexamined Patent Publication No. 51-149975 discloses a net-like material produced by converting a synthetic thermoplastic resin sheet to a porous sheet, and bi-axially drawing the porous sheet to form networks in the porous sheet.

When the net-like sheet material is embedded in earth, a landslide is prevented by an interlocking effect (anchor effect) between the networks of the net-like material and earth. In the interlocking effect, the internal stress in the earth is converted to a force for stretching the sheet material. This stretching force applied to the sheet material embedded in earth is especially strong until the earth stratum on the sheet material is stabilized. This stretching force causes a creep of the sheet material under the each stratum.

To prevent the creeping of the reinforcing sheet material for civil engineering and construction, attempts have been made to reinforce a thermoplastic resin sheet material with a reinforcing fiber bundle having a high tensile strength, a low elongation, and a low creep property. Nevertheless, when the fiber-reinforced material exhibits a low resistance of the reinforcing fiber bundle to drawing out, the reinforcing fiber bundle is easily drawn out from the fiber-reinforced material by the stretching force.

In the fiber-reinforced composite material of the present invention, the individual reinforcing fibers exhibit a high resistance to the drawing out force applied to the composite material. Also, the fiber-reinforced composite material of the present invention can exhibit a very low creep strain of 5% or less even after a high tensile load, for example, corresponding to 40% of the tensile strength of the composite material, is applied thereto for a long time, for example, 1000 hours.

Figure 5:
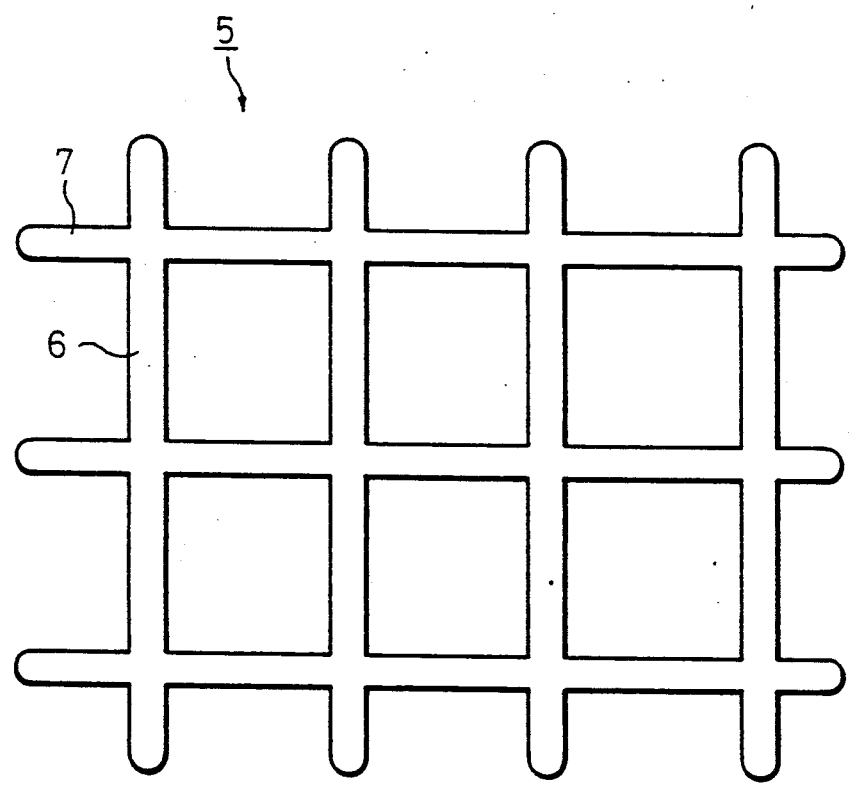
FIG. 5 shows a plane view of a net-like sheet consisting of fiber-reinforced polymeric resin composite material of the present invention and useful for civil engineering and construction.

The fiber-reinforced polymeric resin composite material of the present invention can be converted to a net-like sheet material, as shown in FIG. 5, for civil engineering and construction work.

As shown in FIG. 5, the net-like sheet 5 is composed of a plurality of warps 6 and a plurality of wefts 7 arranged at predetermined intervals.

The above-mentioned fiber-reinforced polymeric resin composite material can be produced by the following process. In this process, at least one fiber bundle consisting essentially of a number of individual reinforcing fibers extending substantially in parallel to each other are heated at a temperature not lower than the melting point of a thermoplastic polymeric resin to be reinforced by the individual fibers, preferably at a temperature of at least 20° C. above the melting point of the polymeric resin.

The preheating temperature is, of course, lower than the melting point or decomposition point of the individual fibers.

Also, the preheating temperature must be lower than the temperature at which the physical properties and mechanical properties of the individual fibers are deteriorated. For example, when aramide fibers are used as individual reinforcing fibers, the preheating temperature is preferably 350° C. or less, and is 150° C. or less above the melting point of the polymeric resin.

Also, when inorganic fibers are empoyed as individual reinforcing fibers, the preheating temperature is preferably 400° C. or less and is 200° C. or less above the melting point of the polymeric resin.

The preheating time is not specifically limited, but usually the preheating operation is carried out for 1 second or more, depending on the preheating temperature.

The preheating step effectively eliminates volatile substances, for example, water and certain substances, for example, bundling agents, which are thermally decomposed or deteriorated and generate gaseous substance at the preheating temperature. Therefore, the preheated individual fibers exhibit an enhanced bonding or adherence to the polymeric resin matrix.

The at least one preheated fiber bundle is impregnated and covered with a melt of the polymeric resin while applying thereto a pressure of 25 kg/cm² or more, preferably 50 kg/cm² or more, but less than 200 kg/cm².

If non-preheated fiber bundle is continuously supplied to the impregnating step and delivered therefrom at a high speed, the polymeric resin melt cannot satisfactorily adhere to the non-preheated fiber bundle, and this is unevenly distributed in the resultant composite material. But, the preheated fiber bundle can be evenly adhered with the polymeric resin melt even at a supply and delivery speed of 1.5 times or more the speed at which the non-preheated fiber bundle can be evenly impregnated with the polymeric resin melt.

Namely, the preheating step is important to ensure that the impregnating step is carried out at a high efficiency and at a high productivity. Also, the preheating step is essential when producing the composite material of the present invention having a high and uniform quality.

In the impregnating step, the pressure is applied to the polymeric resin melt to an extent such that the individual fibers are embedded within the polymeric resin melt in such a manner that 10% to 70%, preferably 20% to 60%, by the number of the individual fibers are separated from each other through portions of the polymeric resin melt, while the remaining individual fibers are maintained in direct contact with each other to form at least one fiber bundle.

In the impregnating step, a certain number of the individual fibers in the preheated fiber bundle are separated from each other through portions of the polymeric resin melt supplied under the high pressure of 25 kg/cm² or more, and the entire peripheries of the separated individual fibers are bonded to portions of the polymeric resin matrix. Nevertheless, 30 to 90%, preferably 40% to 80%, by the number of the individual fibers in the preheated fiber bundle are not separated and are maintained in the form of at least one fiber bundle, and the polymeric resin melt does not penetrate into the inside of the maintained fiber bundle.

Next, the polymeric resin melt-impregnated fiber bundle is shaped by passing it through a shaping nozzle having a predetermined cross-sectional profile and area, to provide a fiber-reinforced polymeric resin composite material having a predetermined shape and size.

The shaping step is preferably carried out at a temperature not lower than the melting point of the polymeric resin.

Figure 6:
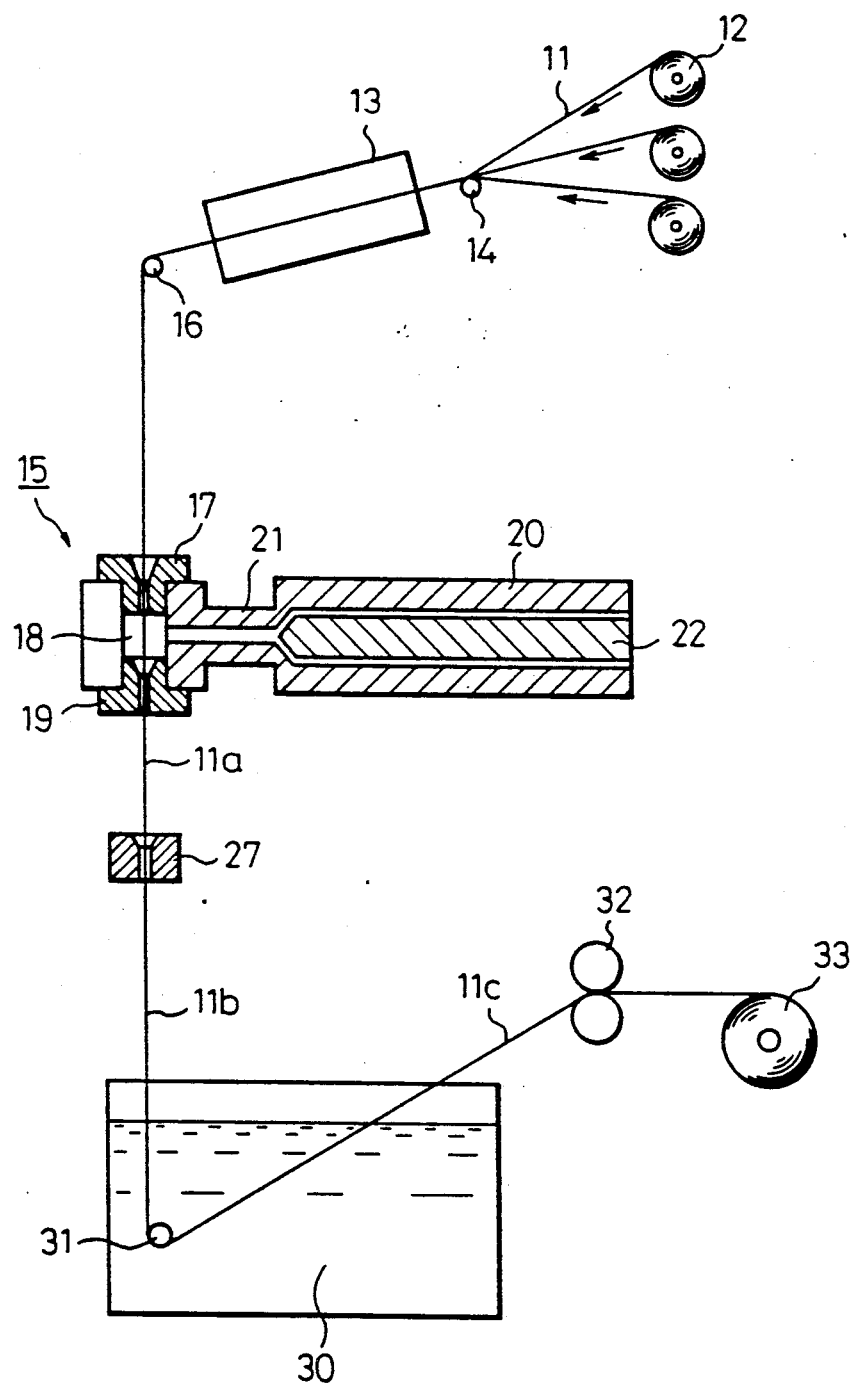
FIG. 6 is an explanatory drawing of an embodiment of apparatuses for producing the fiber-reinforced polymeric resin composite material of the present invention.

The above-mentioned process can be carried out by using the apparatus indicated in FIG. 6. Referring to FIG. 6, one or more fiber bundles 11, each of which is in the form of a non-twisted multifilament yarn or a twisted multifilament yarn consisting of a plurality of individual filaments, are taken up from bobbins 12 and introduced into a preheater 13 through a guide roller 14, at a predetermined speed, and the fiber bundles 11 are preheated in the preheater 13 at a predetermined temperature to eliminate volatile substances, for example, moisture, bundling agents, oiling agents and bonding agents, harmful to the shaping procedure.

To avoid undesirable damage to the individual filaments in the preheating procedure, a non-touch type preheater is preferably employed. Also, to evenly preheat the fiber bundles, preferably the preheater is provided with a reflecting plate. When the preheater 13 heats the fiber bundles 11 at a temperature higher than the melting point of the polymeric resin, it is possible to avoid the generation of gaseous substances from the fiber bundles in the next impregnating step. Preferably, the preheating temperature is 20° C. or more above the melting point of the polymeric resin, to effectively preheat the fiber bundles 11 at a high travelling speed.

If the preheating temperature is excessively high, the energy loss in the preheating procedure becomes excessively large and the individual filaments are thermally damaged.

The preheated fiber bundles are introduced into an impregnating die head 15 through a guide roller 16. The impregnating die head 15 is provided with an inlet die 17, a polymeric resin melt-impregnating chamber 18, and an outlet die 19. The impregnating chamber 18 is connected to an extruder 20 through a throat 21, and a polymeric resin is melted in the extruder 20 and the melt is introduced by a screw 22 into the impregnating chamber 18 through the throat 21.

Figure 7:
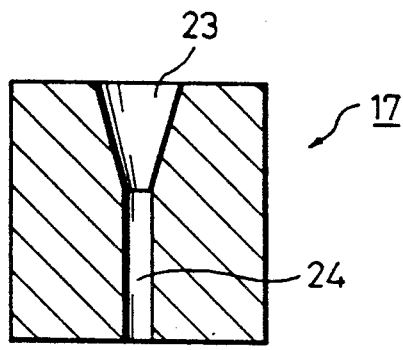
FIG. 7 is an explanatory cross-sectional profile of an embodiment of dies for introducing therethrough a fiber bundle into an impregnation chamber in which the fiber bundle is impregnated with a polymeric resin melt.
Figure 8:
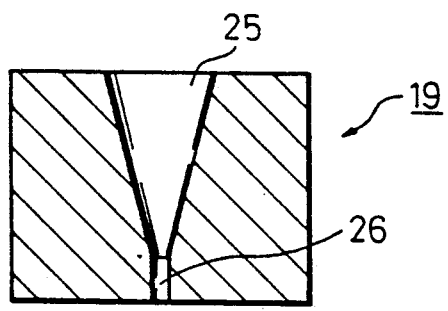
FIG. 8 is an explanatory cross-sectional profile of an embodiment of dies for delivering therethrough a polymeric resin-impregnated fiber bundle from an impregnation chamber.

Referring to FIGS. 6, 7 and 8, the fiber bundles 11 are introduced into the impregnating chamber 18 through the inlet die 17.

The inlet die 17 is provided with a funnel-shaped upper passage 23 converging downward and a lower passage 24. The fiber bundles 11 are easily united in the upper passage 23 and introduced into the lower passage 24. The lower passage 24 is effective for causing the application of a pressure to the polymeric resin melt in the impregnating chamber 18 and for preventing overflow of the polymeric resin melt from the impregnating chamber 18. Therefore, the lower passage 24 preferably has a cross-sectional area large enough to allow the united fiber bundles to pass therethrough at a relatively low friction between the fiber bundles and the inside wall surface thereof, and small enough to prevent an overflow of the polymeric resin melt therethrough. Accordingly, the cross-sectional area of the lower passage 24 is preferably very close to the total cross-sectional area of the united fiber bundles. Usually, the cross-sectional area of the lower passage 24 is in the range of from 1.02 times to 1.7 times the total cross-sectional area of the united fiber bundles. When the cross-sectional area ratio is less than 1.02, the friction between the united fiber bundles and the inside wall surface of the lower passage 14 sometimes becomes excessively large, and the individual filaments in the fiber bundles are damaged. If the cross-sectional area ratio is more than 1.7, sometimes the application of the predetermined pressure to the polymeric resin melt in the impregnating chamber 18 becomes difficult and a portion of the polymeric resin melt overflows through the inlet die 17.

To ensure the application of pressure to the polymeric resin melt in the impregnating chamber 18, and to prevent an overflow of the polymeric resin melt, the length of the lower passage 24 of the inlet die 17 should be as long as possible. Preferably, the length of the lower passage 24 is in the range of from 3 mm to 20 mm.

The united fiber bundles 11 are impregnated with a melt of the polymeric resin under a predetermined pressure of 25 kg/cm$^2$ or more in the impregnating chamber 18, and the impregnated fiber bundles are delivered from the impregnating chamber 18 through the outlet die 19.

The outlet die 19 has a funnel-shaped upper passage 25 converging downward and a lower passage 26, and effectively delivers the fiber bundles impregnated with the polymeric resin melt while maintaining the pressure of the polymeric resin melt in the impregnating chamber at a predetermined level, and preliminarily controls the amount of the polymeric resin melt to be delivered together with the fiber bundles 11. The funnel-shaped upper passage 25 is effective for smoothly introducing the impregnated fiber bundles into the lower passage 26.

The lower passage 26 preferably has a cross-sectional area equal to or little larger than that of the lower passage 14 of the inlet die 17, to maintain the pressure of the polymeric resin melt in the impregnating chamber 18 at a predetermined level and to prevent the delivery of an excessive amount of the polymeric resin melt.

For the same reasons as mentioned above, the length of the lower passage 26 is preferably not longer than the length of the lower passage 24 of the inlet die 17.

The pressure of the polymeric resin melt in the impregnating chamber 18 is controlled to a predetermined pressure of 25 kg/cm$^2$ or more, preferably 50 kg/cm$^2$ or more, to an extent such that portions of the polymeric resin melt penetrate into the fiber bundles so that 10% to 70% by the number of the individual filaments are separated from each other through the penetrated portions of the polymeric resin melt while the remaining individual filaments remain in the form of at least one fiber bundle in which the remaining individual filaments come into direct contact with each other. The separated individual filaments are closely adhered at the entire peripheral surfaces thereof to the polymeric resin melt.

The higher the pressure applied to the polymeric resin melt in the impregnating chamber 18, the larger the number of the separated individual filaments. But, in consideration of the power necessary to drive the screw 22 in the extruder 20 and the working precision of the inlet die 17 and outlet die 19, the maximum pressure of the polymeric resin melt in the impregnating chamber 18 is preferably 200 kg/cm$^2$.

Figure 9:
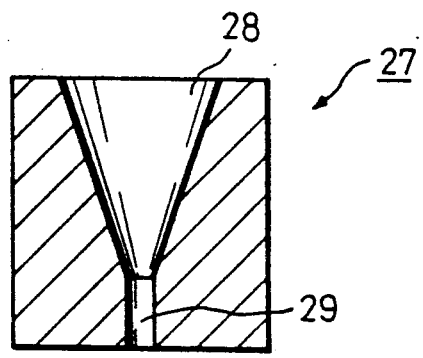
FIG. 9 is an explanatory cross-sectional profile of a shaping nozzle for a polymeric resin-impregnated fiber bundle.

Referring to FIGS. 6 and 9, the impregnated fiber bundles 11a is delivered from the impregnating die head 15 and introduced into a shaping nozzle 27. The shaping nozzle 27 has a funnel-shaped upper passage 28 converging downward and a lower shaping passage 29 having a predetermined cross-sectional profile and area. The cross-sectional profile of the lower shaping passage 29 may be circular or irregular, for example, trigonal, tetragonal or hexagonal, and other polygonal shapes.

The cross-sectional area of the lower shaping passage 29 should be such that it removes an excessive amount of the polymeric resin melt from the impregnated fiber bundles 11a.

The funnel-shaped upper passage 28 is effective for smoothly introducing the impregnated fiber bundles 11a into the lower shaping passage 29 and for storing therein the excessive amount of the polymeric resin melt removed by the lower shaping passage 29.

Preferably, the shaping step in the shaping nozzle 27 is carried out at a temperature not lower than the melting point of the polymeric resin. If the shaping step is carried out at a temperature lower than the melting point of the polymeric resin, sometimes a large power is necessary to draw out the impregnated fiber bundles 11a through the shaping nozzle 27, the adhesion of the individual filaments or the fiber bundles to the polymeric resin melt is broken, and the penetration of the polymeric resin melt into the inside of the fiber bundles is hindered.

Nevertheless, the shaping temperature should not be excessively high. If the shaping temperature is excessively higher than the melting point of the polymeric resin, the polymeric resin melt exhibits an excessively low viscosity, and thus it becomes difficult to adjust the amount of the polymeric resin melt adhered to the fiber bundles to a desired level, the thermal deterioration of the polymeric resin is promoted, and the resultant shaped or molded articles exhibits a poor mechanical strength.

The distance between the outlet end of the outlet die 19 and the inlet end of the shaping nozzle 27 should be as small as possible, to avoid an excessive cooling of the impregnated fiber bundles 11a before the shaping step.

Referring to FIG. 6, the impregnated, shaped fiber bundles 11b are delivered from the shaping nozzle 27 and introduced into a cooling bath 30 containing a cooling medium consisting of, for example, water, through a guide roller 31.

The resultant fiber-impregnated polymeric resin composite material 11c in the form of a continuous strand is taken up from the cooling bath 30 through a pair of delivery rollers 32 and wound around a winding roll 33. The fiber-impregnated polymeric resin composite material 11c taken up from the cooling bath may be directly fed into a strand cutter or pelletizer (not shown) to provide pellets of the fiber-reinforced polymeric resin composite material.

EXAMPLES

The present invention will be further illustrated by way of the following specific examples.

In the examples, the following tests were applied.

(1) Generation of gaseous substances from specimens

A specimen selected from a fiber-reinforced polymeric resin composite material of the present invention, a polymeric resin and reinforcing fibers not impregnated with the polymeric resin was heated in a gas chromatographic tester (available under the trademark of Gas Chromatographic tester Model 80, from Yanagimoto Works) in accordance with a temperature-rising gas chromatographic method, within a carrier gas consisting of helium at an injection temperature of 15° C. above the melting point of the polymeric resin, in such a manner that the heated specimen was maintained at a temperature of 100° C. for 10 minutes, temperature of the specimen was raised to a level of 300° C. at a heating rate of 10° C./min, and then the heated specimen was maintained at the temperature of 300° C. for 10 minutes.

The decomposition peaks indicated on the resultant chromatographic chart were checked, and when the decomposition peaks indicated on the chromatographic chart for the fiber-reinforced polymeric resin composite material conformed to the peaks on the chromatographic charts for the polymeric resin and the reinforcing fibers, the composite material was evaluated as not generating a gaseous substance at a temperature up to 300° C.

When the chromatographic chart for the composite material had one or more decomposition peaks not conforming to those on the chromatographic charts for the polymeric resin and the reinforcing fibers, the composite material was evaluated as generating a gaseous substance at a temperature up to 300° C.

(2) Evenness of diameter of composite strand

A specimen consisting of a fiber-reinforced polymeric resin composite material in the form of a strand was subjected to the following test.

The thickness or diameter x of the strand specimen was measured at 20 locations at intervals of 1 mm by a microscope at a magnification of 30.

The coefficient of variation (CV) in the thickness (diameter) of the composite strand was calculated in accordance with the equation:

$$CV(\%) = \frac{\sqrt{\{\Sigma x^2 - (\Sigma x)^2/20\}/19}}{\Sigma x/20} \times 100$$

wherein x represents a thickness or diameter of the composite strand.

Preferably, CV is 5% or less when calculated from the values of the measured diameters.

(3) Tensile strength and ultimate elongation

A number of fiber-reinforced polymeric resin composite materials in the form of a strand were used as warps and wefts and converted to a net-like sheet, as shown in FIG. 5, in which the warps and wefts were arranged at intervals of 28 mm.

A specimen consisting of 3 warps and 17 wefts, and thus having a width of 84 mm and a length of 476 mm, was prepared from the net-like sheet. The specimen was subjected to a tensile test in accordance with ASTM D638, in which two wefts located at both longitudinal ends of the specimen were held by a pair of grip members in such a manner that the warps were not pressed by the grip members, two warps located at both transversal ends of the specimen were cut at the middles thereof, and the remaining warp was stretched by using a tensile machine (available under the trademark of a Tensile Tester Model 2005, from Intesco Co.) at a temperature of 23° C., at a relative humidity of 50%, and at a stretching rate of 50 mm/min, to determine the tensile strength and ultimate elongation of the specimen. The above-mentioned testing procedures were repeated 10 times.

In the tensile test, the drawing out property of the reinforcing fibers in the specimen was observed and evaluated.

(4) Proportion (MD) of separated individual fibers to total individual fibers

A cross-section of a fiber-reinforced polymeric resin composite was observed by using a reflecting light in an optical microscope at a magnification of 100, and the number (N) of the individual fibers separated from each other and surrounded by portions of the polymeric resin matrix was determined.

The proportion (MD) of the separated individual fibers was calculated in accordance with the equation:

$$MD(\%) = \frac{N}{N_0} \times 100$$

wherein N represents the number of separated individual fibers and $N_0$ represents the total number of individual fibers in the composite material.

(5) Handling property (Bending resistance)

A composite material in the form of a strand was fixed at a supporting point which was 50 cm from a free end thereof. The free portion of the strand having a length of 50 cm was bent at an angle of 60 degrees around the supporting point, and it was determined whether or not the strand was broken at the supporting point.

(6) Creep

The same specimen as that for the tensile test was loaded under a weight corresponding to 40% of the tensile strength of the specimen, at a temperature of 23° C. and a relative humidity of 50%, for 1000 hours, and thereafter, the length of the specimen was measured. The creep strain $C_s$ of the specimen was determined in accordance with the equation:

$$C_s(\%) = \frac{L - L_0}{L_0} \times 100$$

wherein L represents a length of the loaded specimen and $L_0$ represents an original length of the specimen.

(7) Flexural strength and flexural modulus of elasticity

The flexural strength and flexural modulus of elasticity of the specimen were determined in accordance with ASTM D780.

(8) 
The Izod impact strengths, with notch and without notch, of the specimen were determined in accordance with ASTM D256.

(9) Volume fraction ($V_f$) of reinforcing fibers in composite material

The term "volume fraction ($V_f$)" refers to a volume proportion in % of the reinforcing fibers distributed in the polymeric resin matrix in the fiber-reinforced polymeric resin composite material (strand).

The $V_f$ was calculated in accordance with the equation:

$$V_f(\%) = \frac{W_f/d_f}{W_f/d_f + (W_s - W_f)d_r} \times 100$$

wherein $W_f$ represents a total weight of the reinforcing fibers having a length of 90 m, $W_s$ represents a total weight of the composite strand having a length of 90 m, $d_f$ represents a density of the reinforcing fibers, and $d_r$ represents a density of the polymeric resin matrix.

(10) Distribution of individual fibers in shaped article

The distribution of individual reinforcing fibers in an injection molded composite article was evaluated by using a soft X-ray testing machine (made by Softex Co.)

5 ... All individual fibers separated from each other and distributed evenly in polymeric resin matrix
4 ... One or two fiber bundles found.
3 ... Three to seven fiber bundles found.
2 ... Eight or more fiber bundles found.
1 ... All individual fibers in the form of one or more fiber bundles.

EXAMPLE 1

A non-twisted p-type aramide multifilament yarn having a yarn count of 1500 denier/1000 filaments and available under the trademark of Technola, from Teijin Ltd., was preheated at a temperature of 350° C. for 3 seconds by using a preheater. The preheated yarn was introduced into the impregnating die head shown in FIGS. 6, 7 and 8. The preheated multifilament yarn was passed through an inlet die having a lower passage with a diameter of 0.5 mm and a length of 10 mm and introduced into a impregnating chamber filled with a melt of a polyphenylene sulfide (PPS) resin at a temperature of 320° C. and under a pressure of 50 kg/cm², to impregnate the preheated multifilament yarn with the PPS resin melt. The impregnated multifilament yarn was delivered from the impregnating die head through an outlet die having a lower passage with an inside diameter of 0.6 mm and a length of 2 mm, successively shaped by passing the yarn through a shaping nozzle having a lower shaping passage with an inside diameter of 0.55 mm and a length of 5 mm, at a temperature of 320° C., and then cooled. The resultant composite material in the form of strands had a $V_f$ of 57%.

The strands were cut to a length of 3 mm, to provide master pellets for injection molding, and to the master pellets was added an additional amount of PPS resin. The resultant mixture was subjected to an injection molding procedures to provide a molded article having a $V_f$ of 20%.

In the injection molding procedures, the temperature of a pellet inlet portion of a cylinder was 310° C., the temperature of an outlet portion of the cylinder was 310° C., the temperature of an injection nozzle was 310° C., the temperature of a mold was 130° C., and the injection pressure was 800 kg/cm².

The results of the tests are indicated in Table 1.

Comparative Example 1

The same procedures as mentioned in Example 1 were carried out except that the preheating step was omitted.

The results of the tests are shown in Table 1.

Comparative Example 2

The same procedures as mentioned in Example 1 were carried out except that the shaping step was omitted.

The resultant fiber-reinforced polymeric resin composite strands had a $V_f$ of 35%.

Also, the composite strands had a high CV of 9%, because the polymeric resin melt-impregnated fiber bundles were not passed through the shaping nozzle, and thus the distribution of the polymeric resin melt in the composite strands was not uniform.

When the composite strands were pelletized by using a strand cutter, a number of mis-cuttings were found.

The results of the tests are shown in Table 1.

Comparative Example 3

The same procedures as described in Example 1 were carried out except that, in the shaping nozzle the lower shaping passage had an inside diameter of 0.8 mm, and the impregnating step was carried out under a pressure of zero to 5 kg/cm².

The results of the tests are shown in Table 1.

TABLE 1

| Item | Example 1 | Comparative Example 1 | Comparative Example 2 | Comparative Example 3 |
|---|---|---|---|---|
| Tensile strength (kg/cm²) | 1470 | 1290 | 1420 | 1130 |
| Ultimate elongation (%) | 7.5 | 6.6 | 7.2 | 5.8 |
| Flexural strength (kg/cm²) | 1880 | 1750 | 1880 | 1630 |
| Flexural modulus of elasticity (kg/cm²) | 61200 | 55800 | 60300 | 53800 |
| Izod impact strength with notch (kg · cm/cm) | 26 | 22 | 25 | 18 |
| Izod impact strength without notch (kg · cm/cm) | 61 | 51 | 58 | 45 |
| Distribution of fibers | 5 | 4 | 4 | 2 |
| Generation of gaseous substances | No | Yes | No | No |
| Evenness in diameter (%) | 4 | 6 | 9 | 8 |
| MD (%) | 60 | 55 | 50 | 5 |

Note: MD ... proportion of number of separated fibers to total number of fibers

Example 2

The same procedures as those described in Example 1 were carried out, except that the PPS resin was replaced by a polybutylene terephthalate (PBT) resin, the impregnating temperature and the shaping temperature were respectively 300° C., and the $V_f$ of the resultant composite strands was 47%.

Figure 10:
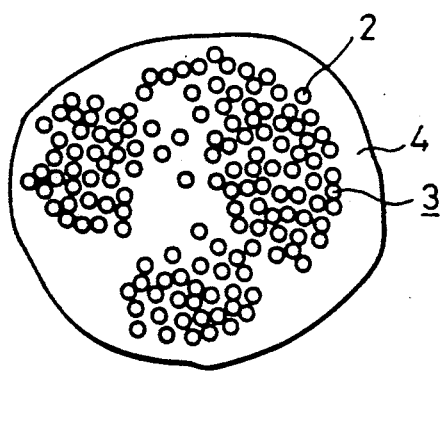
FIGS. 10 to 13 respectively show a cross sectional profile of an embodiment of the fiber-reinforced polymeric resin composite materials of the present invention.

The cross-sectional profile of the composite strands is shown in FIG. 10.

The resultant composite strands were pelletized and then injection molded under the following conditions:

| | |
|---|---|
| Temperature of pellet inlet portion of cylinder: | 260° C. |
| Temperature of outlet portion of cylinder: | 270° C. |
| Temperature of injection nozzle: | 275° C. |
| Temperature of mold: | 70° C. |
| Injection pressure: | 870 kg/cm$^2$ |

The results of the tests are shown in Table 2.

EXAMPLE 3

The same procedures as those described in Example 1 were carried out, except that the PPS resin was replaced by a nylon 46 resin, the impregnating temperature and the shaping temperature were respectively 330° C., and the $V_f$ of the resultant composite strands was 49%.

Figure 11:
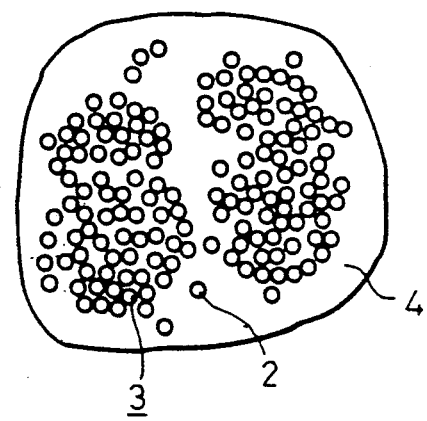

The cross-sectional profile of the composite strands is shown in FIG. 11.

The resultant composite strands were pelletized and then injection molded under the following conditions:

| | |
|---|---|
| Temperature of pellet inlet portion of cylinder: | 300° C. |
| Temperature of outlet portion of cylinder: | 320° C. |
| Temperature of injection nozzle: | 320° C. |
| Temperature of mold: | 120° C. |
| Injection pressure: | 1000 kg/cm$^2$ |

The results of the tests are shown in Table 2.

EXAMPLE 4

The same procedures as those described in Example 1 were carried out, except that the reinforcing fibers consisted of aramide multifilament yarn having a yarn count of 1420 denier/1000 filaments, and available under the trademark of Kevlar 49 from Du Pont, and the $V_f$ of the resultant composite strands was 39%.

Figure 12:
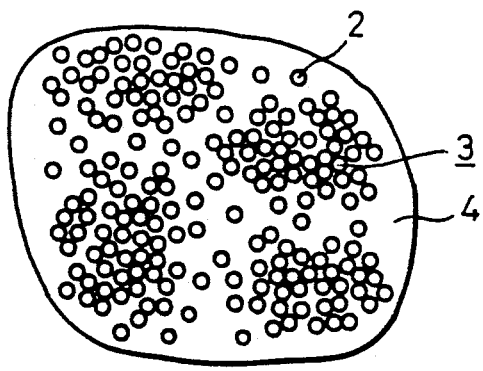

The cross-sectional profile of the composite strands is shown in FIG. 12

The resultant composite strands were pelletized and then injection molded under the following conditions:

| | |
|---|---|
| Temperature of pellet inlet portion of cylinder: | 320° C. |
| Temperature of outlet portion of cylinder: | 330° C. |
| Temperature of injection nozzle: | 335° C. |
| Temperature of mold: | 130° C. |
| Injection pressure: | 1000 kg/cm$^2$ |

The results of the tests are shown in Table 2.

EXAMPLE 5

The same procedures as those described in Example 1 were carried out, except that the reinforcing fibers consisted of a carbon filament yarn having a yarn count of 1782 denier/3000 filaments and the $V_f$ of the resultant composite strands was 30%.

Figure 13:
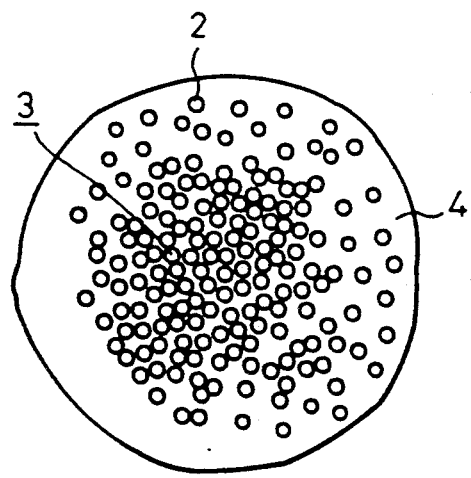

The cross-sectional profile of the composite strands is shown in FIG. 13.

The resultant composite strands were pelletized and then injection molded under the following conditions:

| | |
|---|---|
| Temperature of pellet inlet portion of cylinder: | 320° C. |
| Temperature of outlet portion of cylinder: | 335° C. |
| Temperature of injection nozzle: | 340° C. |
| Temperature of mold: | 130° C. |
| Injection pressure: | 1000 kg/cm$^2$ |

The results of the tests are shown in Table 2.

COMPARATIVE EXAMPLE 4

The same procedures as described in Example 2 were carried out except that the impregnating pressure was zero to 5 kg/cm$^2$ and the inside diameter of the lower shaping passage of the shaping nozzle was 0.8 mm.

Figure 14:
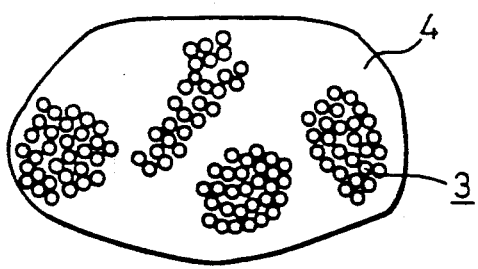
FIGS. 14 to 17 respectively show a cross-sectional profile of an embodiment of conventional fiber-reinforced polymeric resin composite materials.

The cross-sectional profile of the resultant comparative composite strands is shown in FIG. 14.

The results of the tests are shown in Table 2.

COMPARATIVE EXAMPLE 5

The same procedures as described in Example 3 were carried out except that the impregnating pressure was zero to 5 kg/cm$^2$ and the inside diameter of the lower shaping passage of the shaping nozzle was 0.8 mm.

Figure 15:
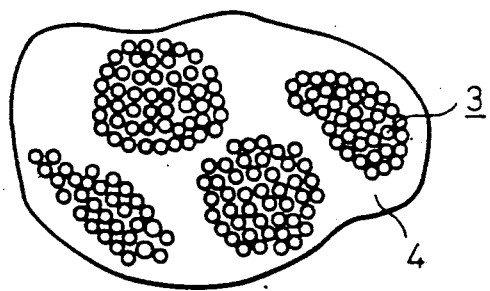

The cross-sectional profile of the resultant comparative composite strands is shown in FIG. 15.

The results of the tests are shown in Table 2.

COMPARATIVE EXAMPLE 6

The same procedures as described in Example 4 were carried out except that the impregnating pressure was zero to 5 kg/cm$^2$ and the inside diameter of the lower shaping passage of the shaping nozzle was 0.8 mm.

Figure 16:
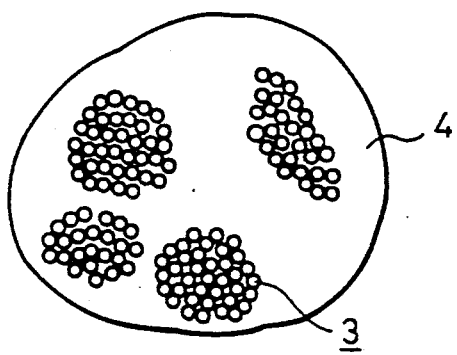

The cross-sectional profile of the resultant comparative composite strands is shown in FIG. 16.

The results of the tests are shown in Table 2.

COMPARATIVE EXAMPLE 7

The same procedures as described in Example 5 were carried out except that the impregnating pressure was zero to 5 kg/cm$^2$ and the inside diameter of the lower shaping passage of the shaping nozzle was 0.8 mm.

Figure 17:
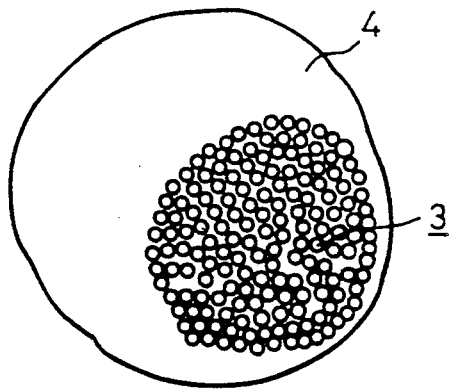

The cross-sectional profile of the resultant comparative composite strands is shown in FIG. 17.

The results of the tests are shown in Table 2.

TABLE 2

| | Example No. | | | | | | | |
|---|---|---|---|---|---|---|---|---|
| | Example | | | | Comparative Example | | | |
| Item | 2 | 3 | 4 | 5 | 4 | 5 | 6 | 7 |
| Type of reinforcing fibers | Technola | Technola | Kevlar 49 | Carbon | Technola | Technola | Kevlar 49 | Carbon |
| Type of polymeric resin | Polybutylene | Nylon 46 | PPS | PPS | PBT | Nylon 46 | PPS | PPS |

TABLE 2-continued

| | Example No. | | | | | | | |
|---|---|---|---|---|---|---|---|---|
| | Example | | | | Comparative Example | | | |
| Item | 2 | 3 | 4 | 5 | 4 | 5 | 6 | 7 |
| | terephtha-late (PBT) | | | | | | | |
| Tensile strength (kg/cm²) | 1170 | 1680 | 980 | 1640 | 750 | 1190 | 700 | 730 |
| Ultimate elongation (%) | 8.9 | 8.2 | 4.5 | 3.1 | 12.0 | 16.0 | 2.7 | 1.5 |
| Flexural strength (kg/cm²) | 1320 | 1730 | 1430 | 2120 | 950 | 1270 | 1050 | 1240 |
| Flexural modulus of elasticity (kg/cm²) | 41900 | 46800 | 54300 | 156600 | 33000 | 34500 | 43500 | 85000 |
| Izod impact strength | | | | | | | | |
| with notch | 21 | 15 | 5 | 4 | 8 | 9 | 2 | 2 |
| without notch | 94 | 54 | 37 | 23 | 80 | 40 | 15 | 20 |
| Distribution of fibers | 5 | 5 | 5 | 5 | 1 | 1 | 1 | 1 |
| Generation of gaseous substances | No | No | No | No | No | No | No | No |
| Evenness in diameter (%) | 4 | 3 | 4 | 4 | 6 | 7 | 7 | 7 |
| MD (%) | 55 | 50 | 40 | 35 | 8 | 8 | 5 | 5 |

EXAMPLE 6

The same procedures as those described in Example 1 were carried out, with the following exceptions. The reinforcing fibers consisted of five rovings each consisting of a p-type aramide (Technola) multifilament yarn having a yarn count of 1500 denier/1000 filaments and a Z-twist number of 74 turns/m.

The polymeric resin was a high density polyethylene resin.

The impregnating temperature was 300° C. and the impregnating pressure was 50 kg/cm².

The resultant composite strands had a diameter of 4 mm and were converted to a net-like sheet in which the composite strands were arranged, as warps and wefts, at intervals of 28 mm.

In the resultant composite strands, the five rovings were embedded separately from each other in the polymeric resin matrix, as shown in FIG. 2A, except that a certain number of the individual filaments were separated from each other. The MD of the composite strands was 20%.

In the resultant composite strands, the fiber bundles exhibited a resistance to drawing out corresponding to 88% of the total tensile strength of the fine rovings.

The composite strands were subjected to the tensile test, creep test, fiber bundle-drawing out test, MD tests, and handling (bending) test.

The results of the tests are shown in Table 3.

EXAMPLE 7

The same procedures as described in Example 6 were carried out except that the five rovings were separately introduced into the impregnating chamber through five separate inlet dies.

The resultant composite strands had the cross-sectional profile shown in FIG. 2A, in which a certain number of the reinforcing individual filaments were separated from each other through portions of the high density polyethylene resin matrix, and an MD of 25%.

Also, the drawing out resistance of the reinforcing individual filaments in the composite strands corresponded to 91% of the total tensile strength of the five rovings.

The results of the tests are shown in Table 3.

EXAMPLE 8

The same procedures as described in Example 6 were carried out except that ten reinforcing rovings each consisting of a p-type aramide (Technola) multifilament yarn having a yarn count of 750 denier/500 filaments and a Z twist number of 74 turns/m were separately introduced into the impregnating chamber through ten separate inlet dies.

The results of the tests are shown in Table 3.

In the tensile test, the reinforcing individual filaments in the composite strands were broken without drawing out. The creep strain of the composite strands was substantially equal to that of the reinforcing rovings.

EXAMPLE 9

The same procedures as those described in Example 7 were carried out except that the reinforcing rovings each consisted of a non-twisted p-type aramide (Technola) multifilament yarn having a yarn count of 1500 denier/1000 filaments.

The results of the tests are shown in Table 3.

COMPARATIVE EXAMPLE 8

The same procedures as described in Example 6 were carried out except that the non-twisted five rovings were doubled and twisted at an S-twist number of 17 turns/m, to provide a single reinforcing filament bundle, and no pressure was applied to the high density polyethylene resin melt in the impregnating chamber at 300° C.

The resultant composite strands had the cross-sectional profile as shown in FIG. 1.

The results of the tests are shown in Table 3.

The resultant comparative composite strands exhibited a poor drawing out resistance of the filament bundle corresponding to 50% of the tensile strength of the filament bundle and a large creep strain of 100% under a low tensile load corresponding to 20% of the tensile strength of the filament bundle.

COMPARATIVE EXAMPLE 9

The same procedures as described in Comparative Example 8 were carried out except that the five reinforcing rovings were each twisted at a Z-twist number of 74 turns/m and the Z-twisted five rovings were doubled and twisted at an S-twist number of 17 turns/m to form a single reinforcing filament bundle.

The results of the tests are shown in Table 3.

The comparative composite strands exhibited a poor drawing out resistance of the filament bundle corresponding to 65% of the tensile strength of the filament bundle, and a large creep strain of 100% even under a small tensile load corresponding to 20% of the tensile strength of the filament bundle.

COMPARATIVE EXAMPLE 10

The same procedures as mentioned in Example 7 were carried out except that the impregnating pressure was changed to 150 kg/cm², and the resultant comparative composite strands had an MD of 90%.

The results of the tests are shown in Table 3. The comparative composite strands exhibited a satisfactory drawing out resistance of the reinforcing filaments but a poor flexural strength.

TABLE 3

| Example No. | Item | Tensile strength (kg/cm²) | Ultimate elongation (%) | Creep strain (%) | Drawing out property of reinforcing filaments(*)1 | MD (%) | Flexural resistance |
|---|---|---|---|---|---|---|---|
| Example | 6 | 150 | 4.6 | 3.0 | 2 | 20 | No breakage |
|  | 7 | 155 | 4.6 | 3.0 | 1 | 25 | " |
|  | 8 | 165 | 4.5 | 2.7 | 0 | 40 | " |
|  | 9 | 170 | 4.5 | 2.5 | 0 | 60 | " |
| Comparative | 8 | 95 | 5.0 | 100(*)2 | 9 | 5 | " |
| Example | 9 | 110 | 4.7 |  | 9 | 8 | No breakage |
|  | 10 | 175 | 4.5 |  | 0 | 90 | Broken |

Note:
(*)1 Number of reinforcing filament bundles drawn out from 10 composite strands
(*)2 Creep test carried out under tensile load corresponding to 20% of tensile strength of reinforcing filament bundles.

What is claimed is:

1. A fiber-reinforced polymeric resin composite material comprising:
   (A) a matrix consisting essentially of a thermoplastic polymeric resin; and
   (B) a number of reinforcing individual fibers extending substantially in parallel to each other and embedded within the polymeric resin matrix in a manner such that 10 to 70% of the number of individual fibers are separated from each other through portions of the polymeric resin matrix, while the remaining individual fibers come into direct contact with each other to form at least one fiber bundle.

2. The composite material as claimed in claim 1, wherein the individual reinforcing fibers comprise at least one type of fiber selected from the group consisting of carbon fibers, glass fibers, aramide fibers, stainless steel fibers, copper fibers, and amorphous metal fibers.

3. The composite material as claimed in claim 1, wherein the individual reinforcing fibers are substantially free from substances which generate gaseous substances at a temperature not lower than the melting point of the polymeric resin.

4. The composite material as claimed in claim 1, wherein the polymeric resin comprises at least one type of polymer selected from the group consisting of polyamides, polyolefins, polyesters, polyacrylates, polysulfones, polyarylene-sulfides, polyether sulfones, polyetherimides, polyamideimides, polyacrylonitrile, polycarbonates, polyacetals, and polystyrene.

5. The composite material as claimed in claim 1, wherein the individual fibers are in an amount of 10 to 90% based on the weight of the polymeric resin matrix.

6. The composite material as claimed in claim 1, wherein the individual fibers have a diameter of 3 to 200 μm.

7. The composite material as claimed in claim 1, which exhibits a creep strain of 5% or less after a tensile load corresponding to 40% of the tensile strength of the composite material is applied thereto for 1000 hours.

8. A high strength net-like material for civil engineering work, comprising the polymeric resin-fiber composite material as claimed in claim 1.

* * * * *